United States Patent
Nakagawa

[11] 3,761,161
[45] Sept. 25, 1973

[54] LENS SYSTEM HAVING A LONG FOCAL LENGTH

[75] Inventor: Jihei Nakagawa, Tokyo, Japan

[73] Assignee: Olympus Optical Company Limited, Tokyo, Japan

[22] Filed: Apr. 7, 1972

[21] Appl. No.: 241,926

[30] Foreign Application Priority Data
Apr. 9, 1971   Japan.............................. 46/21789

[52] U.S. Cl.................................. 350/218, 350/176
[51] Int. Cl..................... G02b 9/60, G02b 13/02
[58] Field of Search................... 350/218, 176, 215

[56] References Cited
UNITED STATES PATENTS
2,298,993   10/1942   Warmisham............ 350/218 X
3,467,462    9/1969   Kazamaki et al........... 350/177 X

*Primary Examiner*—John K. Corbin
*Attorney*—Eric H. Waters et al.

[57] ABSTRACT

A lens system having a long focal length, which consists of a first positive lens component, a second positive meniscus lens component that has at its object side a convex surface, a third negative lens component, a fourth negative lens component and a fifth positive lens component, large air spaces being present between the third component lens and the fourth component lens and between the fourth lens components and the fifth lens components, respectively, and which is defined by the following five conditions, i.e., 1. $0.7f > f_{1,2,3} > 0.4f$,
2. $0.05f > d_2 > 0.01f$,
3. $|r_5| > 3f, r_5 > 0$,
4. $0.2f > d_8 > d_6 > 0.1f$, and
5. $f > f_5 > 0.8f$ where $f$ is a composite focal length of the total lens system, $f_{1,2,3}$ is a composite focal length of the first, second and third component lenses, and $r_i$ ($i=1, 2, \ldots 10$) and $d_i$ ($i=1, 2, \ldots 9$) are radii of curvatures of the successive lens surfaces counted from the side of an object and axial thicknesses of or air spaces between the successive lenses counted from the side of the object, respectively. The telephoto ratio is on the order of 0.85 – 0.9.

3 Claims, 7 Drawing Figures

FIG_1
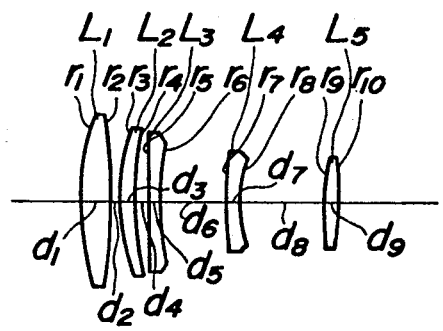
FIG_2a
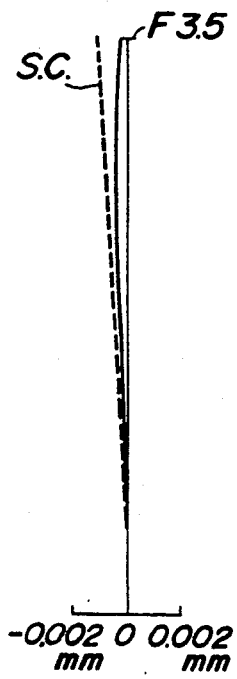
FIG_2b
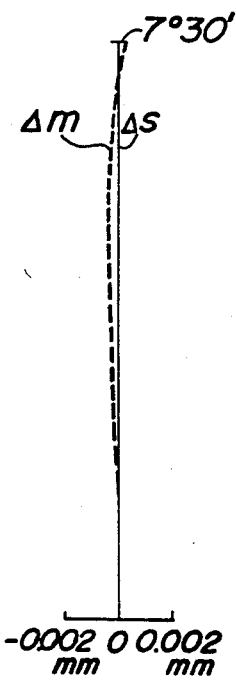
FIG_2c
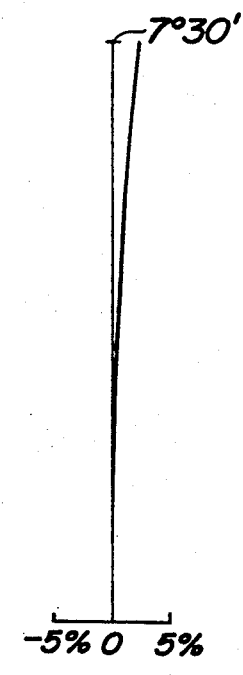

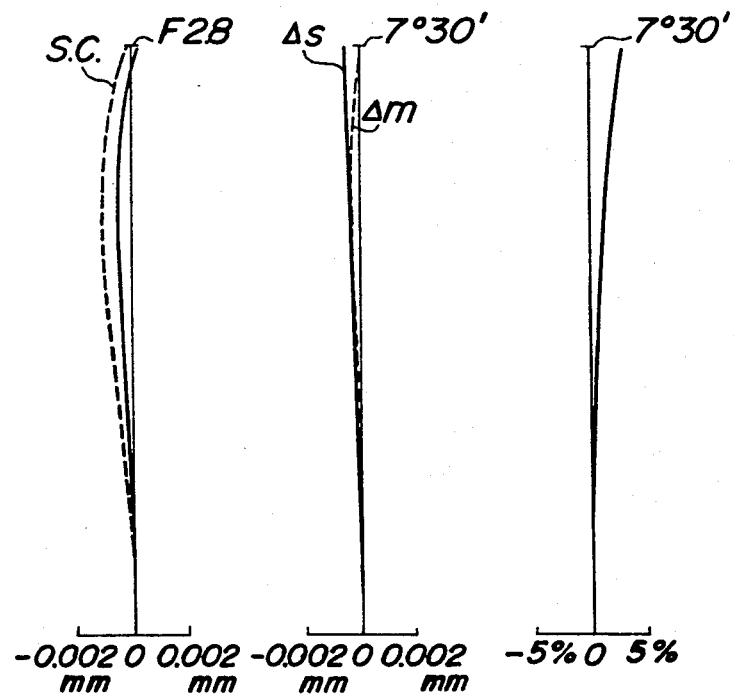

LENS SYSTEM HAVING A LONG FOCAL LENGTH

This invention relates to a lens system having a long focal length, which has been known as Ernostar type lens system having a long focal length.

The Ernostar type lens system having a long focal length has significantly corrected spherical aberration, astigmatism, distortion, etc., but has the disadvantage that the telephoto ratio (the ratio of the distance between the front surface of the first lens component and the film surface to the composite focal length of the whole lens system) could not be made small.

The object of the invention, by increasing the refractive power of the first and second lenses of the Ernostar type lens system and by adding a negative lens to the rear side of the second lens so as to correct the aberration which is produced by the increased refractive power of the first and second lenses, and by adopting suitable air spaces between each lens component and adjacent component lenses, is to provide a lens system having a long focal length, whose telephoto ratio is extremely small, on the order of 0.85 – 0.9, and which has significantly corrected spherical aberration, astigmatism, distortion, etc.

A feature of the invention is the provision of a lens system having a long focal length, which consists of a first positive lens component, a second positive meniscus lens component that has at its object side a convex surface, a third negative lens component, a fourth group of negative lens component, and a fifth positive lens component, large air spaces being present between the third lens component and the fourth lens component and between the fourth lens component and the fifth lens component, respectively, and which is defined by the following five conditions, i.e.

1. $0.7f > f_{1,2,3} > 0.4f$,
2. $0.05f > d_2 > 0.01f$,
3. $|r_5| > 3f, r_5 < 0$,
4. $0.2f > d_8 > d_6 > 0.1f$, and
5. $f > f_5 > 0.8f$ where $f$ is a composite focal length of the total lens system, $f_{1,2,3}$ is a composite focal length of the first, second and third lens components, and $r_i$ ($i=1, 2, \ldots 10$) and $d_i$ ($i=1, 2, \ldots 9$) are radii of curvatures of the successive lens surfaces counted from the side of an object and axial thicknesses of or air spaces between the successive lenses counted from the side of the object, respectively.

For a better understanding of the invention, the same will be explained by reference to the accompanying drawings, in which:

FIG. 1 shows in cross-section a lens system having a long focal length constructed according to the invention;

FIGS. 2a to 2c show aberration characteristic curves of one embodiment of the invention; and FIGS. 3a to 3c show aberration characteristic curves of another embodiment of the invention.

Referring to the drawings, a lens system having a long focal distance according to the invention is shown in FIG. 1 in which $L_1$ designates a first positive lens component, $L_2$ shows a second positive meniscus lens component that has at its object side a convex surface, $L_3$ illustrates a third negative lens component, $L_4$ designates a negative lens component, and $L_5$ shows a fifth positive lens component.

In accordance with the invention a large air space $d_6$ is present between the third lens component $L_3$ and the fourth lens component $L_4$. A large air space $d_8$ is also present between the fourth lens component $L_4$ and the fifth lens component $L_5$. Moreover, the composite focal length $f_{1,2,3}$ of the first, second and third lens components $L_1$, $L_2$ and $L_3$, the air space $d_2$ between the first lens component $L_1$ and the second lens component $L_2$, the radius of curvature $r_5$ of the front surface of the third lens component $L_3$, the air space $d_6$ between the third and fourth lens component $L_3$ and $L_4$, the air space $d_8$ between the fourth and fifth lens components $L_4$ and $L_5$, and the focal length $f_5$ of the fifth lens component $L_5$ are defined by the following five conditions, i.e. respectively, 1. $0.7f > f_{1,2,3} > 0.4f$,
2. $0.05f > d_2 0.01f$,
3. $|r_5| > 3f, r_5 < 0$,
4. $0.2f > d_8 > d_6 > 0.1f$, and
5. $f > f_5 > 0.8f$ where $f$ is a composite focal length of the total lens system, $f_{1,2,3}$ is composite focal length of the first, second and third lens components $L_1$, $L_2$ and $L_3$, and $r_i$ ($i=1, 2, \ldots 10$) and $d_i$ ($i=1, 2, \ldots 9$) are radii of curvatures of the successive lens surfaces counted from the side of an object and axial thicknesses of or air spaces between the successive lenses counted from the side of the object, respectively.

The above mentioned condition (1) relates to the telephoto ratio. If $f_{1,2,3}$ is not less than $0.7f$ and is not larger than 0.4 f, it is impossible to obtain a lens system having a long focal distance and having significantly corrected spherical aberration, astigmatism, distortion, etc. and whose telephoto ratio is extremely small, on the order of 0.85 – 0.9. If $f_{1,2,3}$ is smaller than $0.4f$, the refractive power of the fourth lens component $L_4$ becomes strong. This, however, is not desirable for the correction of aberrations. If $f_{1,2,3}$ is larger than $0.7f$, it is impossible to make the telephoto ratio on the order of 0.85 – 0.9.

In the condition (2), if $d_2$ becomes smaller than $0.01f$, the coma on the periphery of the picture surface can be improved. This, however, results in a difficulty in removing the chromatic aberrations on axis and on magnification. On the contrary, if $d_2$ is larger than $0.05f$, the chromatic aberration can be corrected, while the coma, and more particularly, the coma on the periphery of the picture surface becomes degraded.

The condition (3) is essential for the correction of the spherical aberration, chromatic aberration on axis, coma and astigmatism. If $|r_5|$ is smaller than $3f$, it is difficult to correct the spherical aberration and the chromatic aberration on axis. If $r_5 > 0$, the coma and astigmatism become degraded. It is difficult to significantly correct the coma and astigmatism even though the other elements are changed.

The condition (4) is associated with the conditions (1) and (5). If $d_6$ is smaller than $0.1f$, it is impossible to make the telephoto ratio small on the order of 0.85 – 0.9. If $d_8$ becomes smaller than $d_6$, it is impossible to significantly correct the distortion. If $d_8$ is larger than $0.2f$, the improvement of the symmetry of the aberration out of axis becomes difficult.

In the condition (5), if $f_5$ is smaller than $0.8f$, the bobbin type distortion can be made small, but the coma becomes degraded. If $f_5$ is larger than $f$, the distortion is increased.

The invention will now be described with reference to the following examples.

EXAMPLE 1

| | | |
|---|---|---|
| $r_1=0.3644$ | | $n_1=1$ |
| | $d_1=0.0456$ | $n_2=1.618$ | $\nu_1=63.38$ |
| $r_2=-3.2138$ | | |
| | $d_2=0.0196$ | $n_3=1$ |
| $r_3=0.3799$ | | |
| | $d_3=0.0397$ | $n_4=1.618$ | $\nu_2=63.38$ |
| $r_4=1.1428$ | | |
| | $d_4=0.0119$ | $n_5=1$ |
| $r_5=-4.2528$ | | |
| | $d_5=0.0172$ | $n_6=1.76182$ | $\nu_3=26.55$ |
| $r_6=0.6858$ | | |
| | $d_6=0.1271$ | $n_7=1$ |
| $r_7=1.9622$ | | |
| | $d_7=0.0171$ | $n_8=1.66998$ | $\nu_4=39.32$ |
| $r_8=0.2119$ | | |
| | $d_8=0.1508$ | $n_9=1$ |
| $r_9=1.1395$ | | |
| | $d_9=0.0138$ | $n_{10}=1.80518$ | $\nu_5=25.43$ |
| $r_{10}=-1.7395$ | | |
| | | $n_{11}=1$ |

$f=1.0mm, f_{1,2,3}=0.521$
$1:3.5, f_5=0.857$
The telephoto ratio=0.87

The aberration characteristic curves of the present embodiment are shown in FIGS. 2a to 2c. FIG. 2a shows the spherical aberrations and sine conditions, FIG. 2b the astigmatisms, and FIG. 2c the distortion.

As seen from these aberration characteristic curves, the lens system according to the present embodiment makes it possible to significantly correct these aberrations. Particularly, the above Table shows that the telephoto ratio is 0.87.

EXAMPLE 2

| | | |
|---|---|---|
| $r_1=0.4104$ | | $n_1=1$ |
| | $d_1=0.0579$ | $n_2=1.618$ | $\nu_1=63.38$ |
| $r_2=-3.6443$ | | |
| | $d_2=0.0297$ | $n_3=1$ |
| $r_3=0.3853$ | | |
| | $d_3=0.0505$ | $n_4=1.618$ | $\nu_2=63.38$ |
| $r_4=1.4567$ | | |
| | $d_4=0.0125$ | $n_5=1$ |
| $r_5=-4.1705$ | | |
| | $d_5=0.0201$ | $n_6=1.76182$ | $\nu_3=26.55$ |
| $r_6=0.6713$ | | |
| | $d_6=0.1154$ | $n_7=1$ |
| $r_7=1.5982$ | | |
| | $d_7=0.0216$ | $n_8=1.66998$ | $\nu_4=39.32$ |
| $r_8=0.2255$ | | |
| | $d_8=0.1515$ | $n_9=1$ |
| $r_9=11.8177$ | | |
| | $d_9=0.0250$ | $n_{10}=1.80518$ | $\nu_5=25.43$ |
| $r_{10}=-0.7426$ | | |
| | | $n_{11}=1$ |

$f=1.0mm, f_{1,2,3}=0.559$
$1:2.8, f_5=0.869$
The telephoto ratio=0.9

The aberration characteristic curves of the present embodiment are shown in FIGS. 3a to 3c. FIG. 3c shows the spherical aberrations and sine condition, FIG. 3b the astigmatisms, and FIG. 3c the distortion.

As seen from these aberration characteristic curves, the lens system according to the present modified embodiment makes it also possible to significantly correct these aberrations. Particularly, the above Table shows that the telephoto ratio is 0.9.

What is claimed is:

1. A lens system having a long focal length, which consists of a first positive lens component, a second positive meniscus lens component that has at its object side a convex surface, a third negative lens component, a fourth negative lens component, and a fifth positive lens component, large air spaces being present between the third lens component and the fourth lens component and between the fourth lens component and the fifth lens component, respectively, and which is defined by the following five conditions, i.e., 1. $0.7f > f_{1,2,3} > 0.4f$,
2. $0.05f > d_2 > 0.01f$,
3. $|r_5| > 3f, r_5 < 0$,
4. $0.2f > d_8 > d_6 > 0.1f$, and
5. $f > f_5 > 0.8f$ where $f$ is a composite focal length of the total lens system, $f_{1,2,3}$ is a composite focal length of the first, second and third lens components, and $r_i$ ($i=1, 2, \ldots 10$) and $d_i$ ($=1, 2, \ldots 9$) are radii of curvatures of the successive lens surfaces counted from the side of an object and axial thicknesses of or air spaces between the successive lenses counted from the side of the object, respectively.

2. A lens system having a long focal length as claimed in claim 1, wherein $f=1.0, f_{1,2,3}=0.521, 1:3.5, f_5=0.857$ and the telephoto ratio is 0.87 and $r_1$ to $r_{10}$, $d_1$ to $d_9$, $n_1$ to $n_{11}$ and $\nu_1$ to $\nu_5$ are defined by the following values

| | | |
|---|---|---|
| $r_1=0.3644$ | | $n_1=1$ |
| | $d_1=0.0456$ | $n_2=1.618$ | $\nu_1=63.38$ |
| $r_2=-3.2138$ | | |
| | $d_2=0.0196$ | $n_3=1$ |
| $r_3=0.3799$ | | |
| | $d_3=0.0397$ | $n_4=1.618$ | $\nu_2=63.38$ |
| $r_4=1.1428$ | | |
| | $d_4=0.0119$ | $n_5=1$ |
| $r_5=-4.2528$ | | |
| | $d_5=0.0172$ | $n_6=1.76182$ | $\nu_3=26.55$ |
| $r_6=0.6858$ | | |
| | $d_6=0.1271$ | $n_7=1$ |
| $r_7=1.9622$ | | |
| | $d_7=0.0171$ | $n_8=1.66998$ | $\nu_4=39.32$ |
| $r_8=0.2119$ | | |
| | $d_8=0.1508$ | $n_9=1$ |
| $r_9=1.1395$ | | |
| | $d_9=0.0138$ | $n_{10}=1.80518$ | $\nu_5=25.43$ |
| $r_{10}=-1.7395$ | | |
| | | $n_{11}=1$ |

3. A lens system having a long focal length as claimed in claim 1, wherein $f=1.0, f_{1,2,3}=0.559, 1:2.8, f_5=0.869$ and the telephoto ratio is 0.9 and $r_1$ to $4_{10}$, $d_1$ to $d_9$, $n_1$ to $n_{11}$ and $\nu_1$ to $\nu_5$ are defined by the following values

| | | |
|---|---|---|
| $r_1=0.4104$ | | $n_1=1$ |
| | $d_1=0.0579$ | $n_2=1.618$ | $\nu_1=63.38$ |
| $r_2=-3.6443$ | | |
| | $d_2=0.0297$ | $n_3=1$ |
| $r_3=0.3853$ | | |
| | $d_3=0.0505$ | $n_4=1.618$ | $\nu_2=63.38$ |
| $r_4=1.4567$ | | |
| | $d_4=0.0125$ | $n_5=1$ |
| $r_5=-4.1705$ | | |
| | $d_5=0.0201$ | $n_6=1.76182$ | $\nu_3=26.55$ |
| $r_6=0.6713$ | | |
| | $d_6=0.1154$ | $n_7=1$ |
| $r_7=1.5982$ | | |
| | $d_7=0.0216$ | $n_8=1.66998$ | $\nu_4=39.32$ |
| $r_8=0.2255$ | | |
| | $d_8=0.1515$ | $n_9=1$ |
| $r_9=11.8177$ | | |
| | $d_9=0.0250$ | $n_{10}=1.80518$ | $\nu_5=25.43$ |
| $r_{10}=-0.7426$ | | |
| | | $n_{11}=1$ |

* * * * *